Dec. 31, 1929.    G. HARVIS    1,741,625
ELECTRIC HEATING DEVICE
Filed May 25, 1928
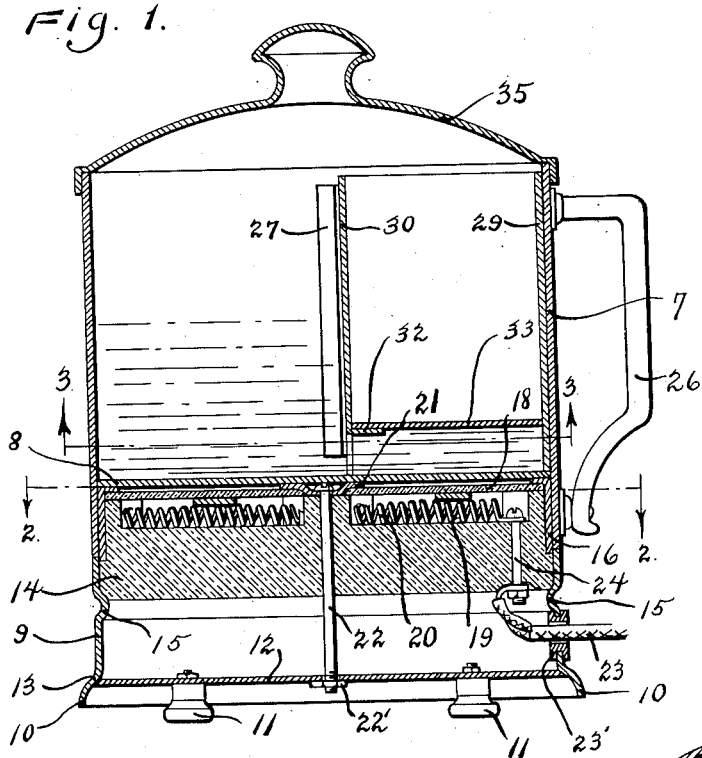
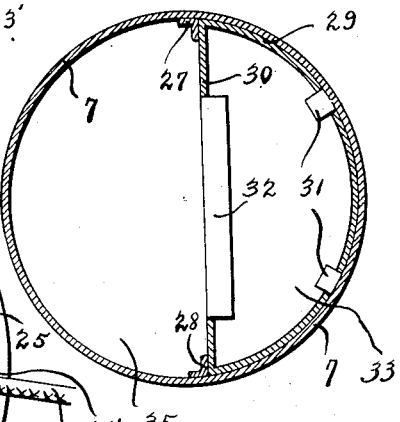
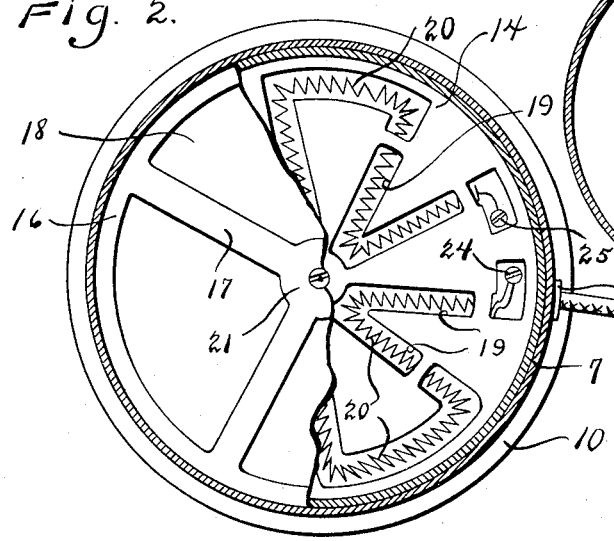
INVENTOR.
George Harvis Patented Dec. 31, 1929

1,741,625

UNITED STATES PATENT OFFICE

GEORGE HARVIS, OF DETROIT, MICHIGAN

ELECTRIC HEATING DEVICE

Application filed May 25, 1928. Serial No. 280,533.

My invention relates to a new and useful improvement in an electric heating device intended for use both as an electric plate and as a water heater, and especially adapted for use when used as a water heater for shaving purposes.

It is an object of the present invention to provide a device of this class which will be simple in structure, economical of manufacture, durable and highly efficient in use.

Another object of the invention is the provision of an electric heating device of this class in which a container may be easily and quickly removed from the heating element to provide an electric heating plate.

Another object of the invention is the provision of a simple and effective means of mounting the heating element in its support so that it may be easily and quickly removed therefrom and placed therein.

Other objects will appear hereinafter.

The invention consists in the combination and arrangement of parts hereinafter described and claimed.

The invention will be best understood by a reference to the accompanying drawing which form a part of this specification and in which, Fig. 1 is a central vertical sectional view of the invention.

Fig. 2 is a sectional view taken on line 2—2 of Fig. 1 with parts broken away.

Fig. 3 is a sectional view taken on line 3—3 of Fig. 1.

In the device there is provided a container comprising a cylindrical member 7 having a base 8 mounted therein intermediate the ends of the cylindrical member to provide a container, the side walls of which project downwardly beyond the base 8. The cylindrical supporting base 9 is provided at its lower end with an outwardly flared edge 10 providing a shoulder 13, against which engages a plate 12 carrying supporting legs 11. A disc 14 made from insulating material is positioned in the base 9 so as to engage at its lower edge the upper portion of the bead 15 which is pressed inwardly of the base 9 intermediate the ends thereof. Embracing the upper portion of the insulating disc 14 is a ring 16 having the radially extending arms 17 projected inwardly from the upper edge thereof, these arms 17 radiating outwardly from a hub 21 and serving to engage the upper surface of a cover 18 formed from mica or other suitable insulating material which serves to cover grooves or recesses 19 formed in the upper face of the insulating disc 14 and in which is positioned the heating element 20. A bolt 22 is projected through the hub 21 and through the plate 12, the nut 22' serving to clamp the plate 12 against the shoulder 13 to clamp, through the cooperation of the bolt 22, the insulating disc 14 against the bead 15, while at the same time, retaining the ring 16 in position. The wires 23 are projected through the base 9, a suitable insulating sleeve 23' being provided for this purpose, the wires being connected to the terminals 24 and 25.

Mounted on one side of the container or cylindrical member 7 is a handle 26.

Mounted on the inner surface of the container 7 and extending axially thereof, are the angle irons 27 and 28 which serve as guides for an auxiliary container positioned in the member 7. This auxiliary container comprises the arcuate wall 29 and the wall 30. Tongues 31 are punched inwardly adjacent the lower end of the wall 29 and a tongue 32 is punched inwardly adjacent the lower end of the wall 30, these tongues serving to engage and support a bottom 33 which is positioned above the lower ends of the portions 29 and 30, so as to retain the bottom 33 spaced above the base 8 as clearly appears in Fig. 1.

The construction is such that when water or other liquid is poured into the container 7 it has access to the space below the bottom 33. A cover 35 is mounted on the container 7.

When used for heating purposes the auxiliary container may be positioned in place, as shown in Fig. 1, thus serving as a soap receptacle when the device is used for shaving purposes and the container 7 serving as a container for water which may be heated to any desired degree by the heating element 20.

By lifting the cylindrical member 7 from about the ring 16 an electric heating plate is provided which may be used for any desired purposes.

There is thus provided in the single device a water container which may be electrically heated and a heating plate which may be used for ordinary purposes when the water container is removed therefrom.

The device, as shown, is one which may be compactly built and transported from place to place without requiring very much space.

While I have illustrated and described the preferred form of my invention, I do not wish to limit myself to the precise details of structure shown, but desire to avail myself of such variations and modifications as come within the scope of the appended claim.

Having thus described my invention what I claim as new and desire to secure by Letters Patent is:

A device of the class described, comprising: a cylindrical member having a bead pressed inwardly intermediate its ends and flared outwardly adjacent one end to provide a shoulder on its inner side; a ring mounted within said member; an electric heating plate engageable by said ring and engaging at its undersurface the uppper side of said bead; a closure plate positioned within the end limits of said member and engaging said shoulder; and a bolt projected through said heating plate and said closure plate for clamping said heating plate against said bead and said closure plate against said shoulder.

In testimony whereof I have signed the foregoing specification.

GEORGE HARVIS.